Patented Sept. 27, 1932

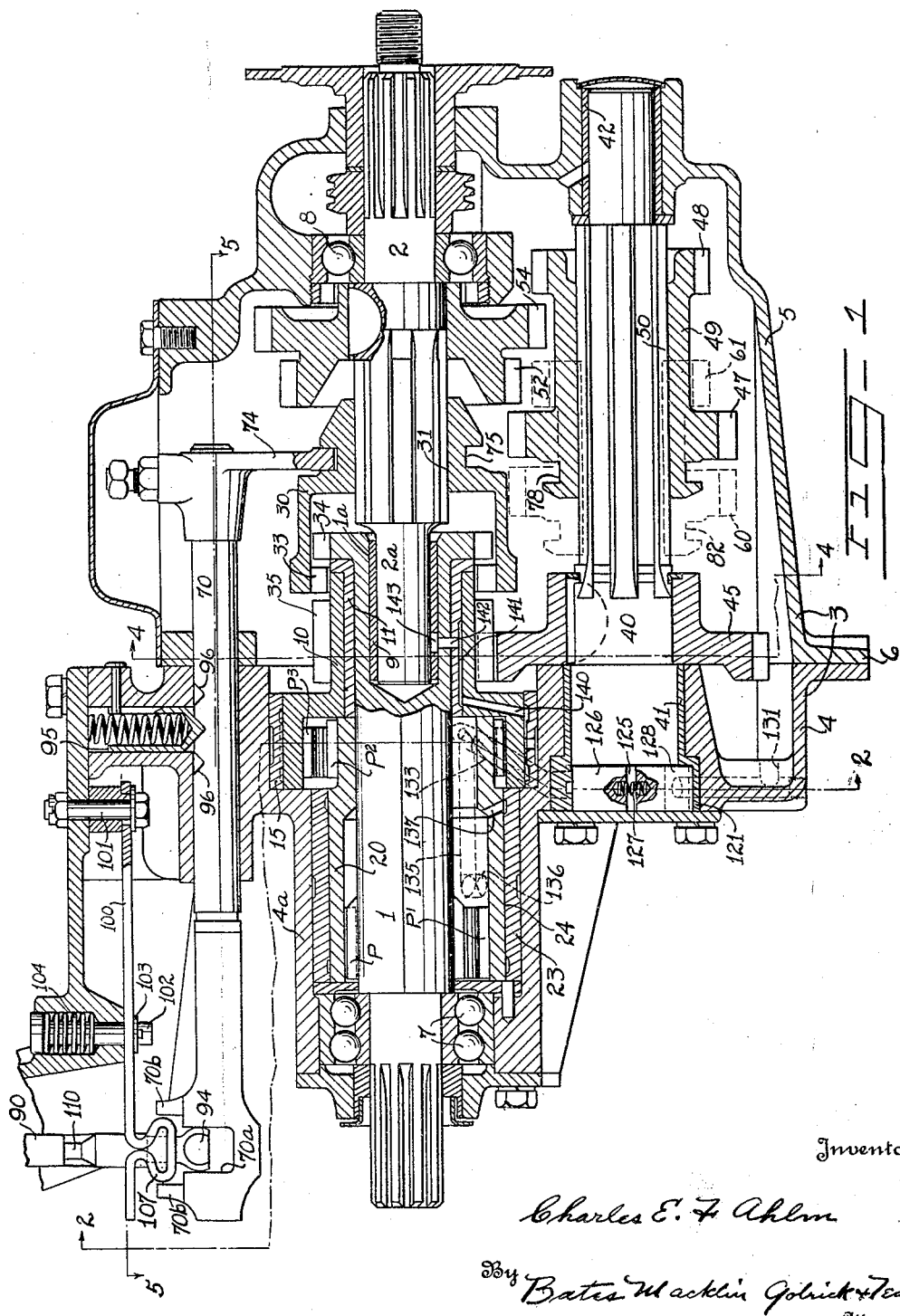

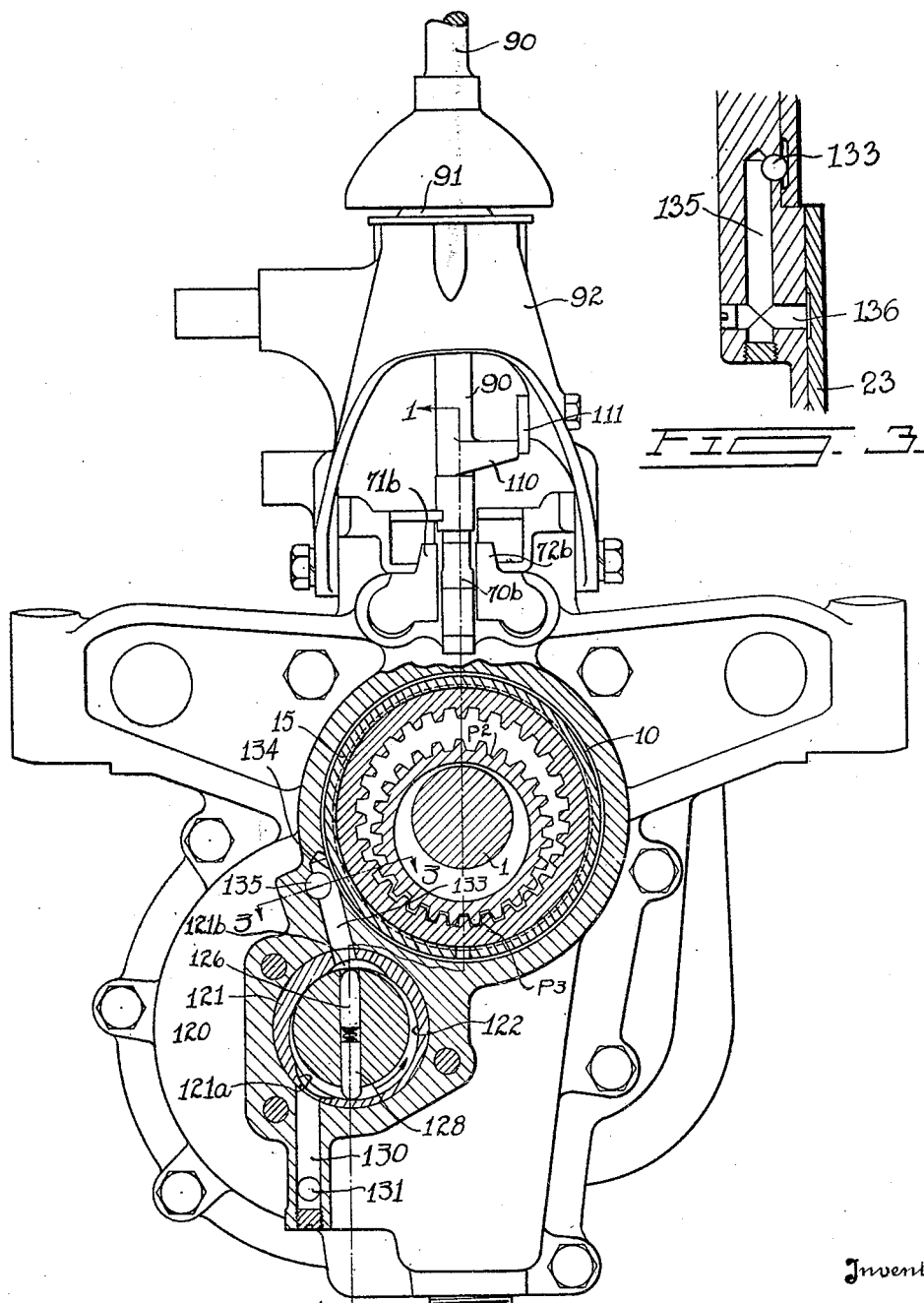

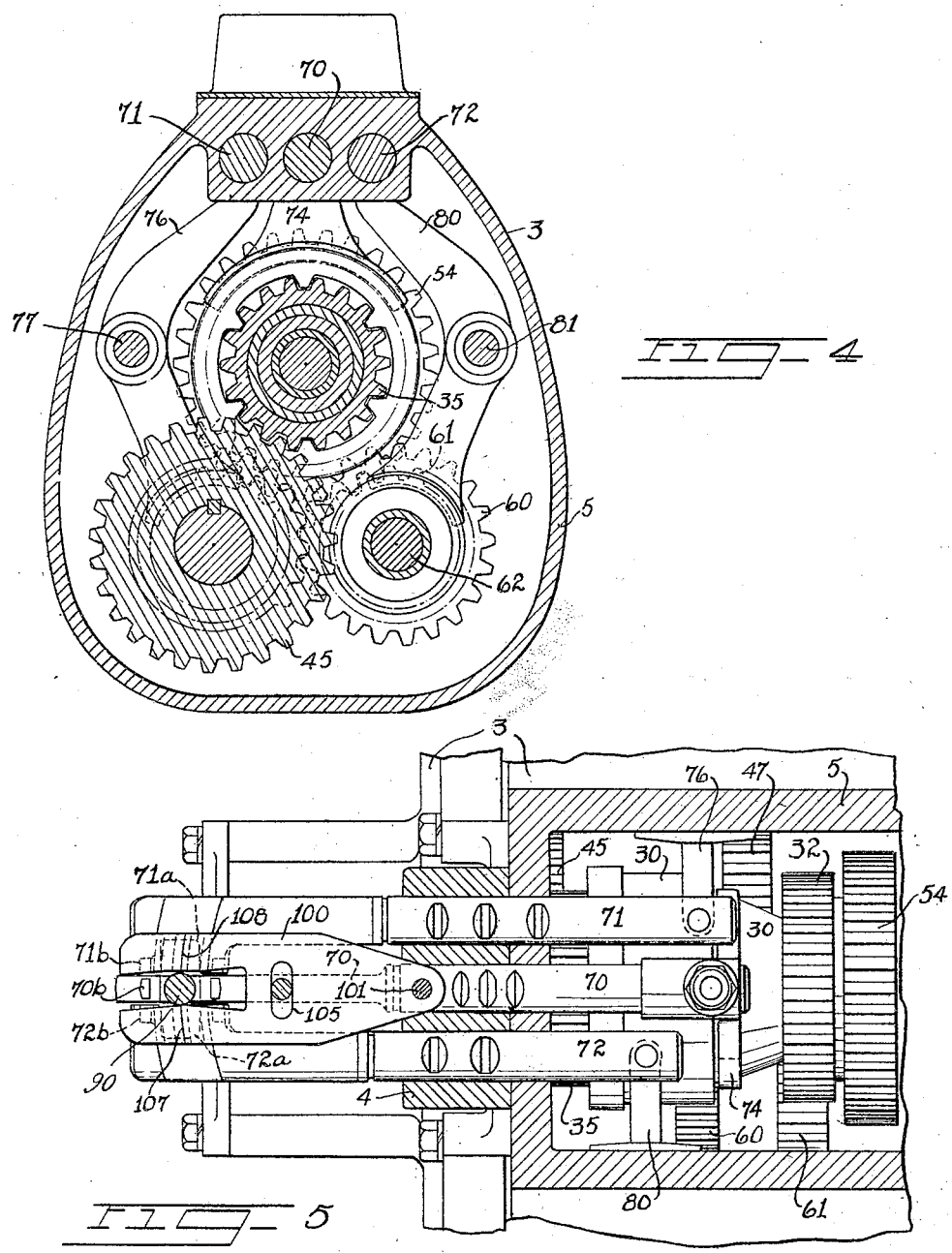

1,880,064

UNITED STATES PATENT OFFICE

CHARLES E. F. AHLM, OF EAST CLEVELAND, OHIO, ASSIGNOR, BY MESNE ASSIGNMENTS, TO AUTOMOTIVE RESEARCH CORPORATION, OF WARREN, OHIO, A CORPORATION OF DELAWARE

TRANSMISSION GEARING

Application filed December 9, 1926. Serial No. 153,545.

This invention relates to variable speed transmission gearing. The object is to provide an improved unitary change speed transmission mechanism for motor vehicles which shall have more than one quiet speed, which may be easily constructed, easily controlled and generally efficient in operation. A specific object is to provide a change speed transmission mechanism employing an internal-external gear train and an external spur gear train, each train being connected across the same two shafts and in which both trains are arranged to be conveniently lubricated from the same oil containing portion of the casing.

A still more specific object is to provide a gearing for connecting a pair of shafts for two speeds including direct drive which shall be extremely compact by reason of the arrangement of gear elements and bearings therefor.

Further objects and features of the invention will become apparent from the following detailed description relating to the accompanying drawings wherein I have shown my preferred form. The essential novel characteristics are summarized in the claims.

In the drawings Fig. 1 is a central vertical cross-sectional view taken through the entire gearing; Fig. 2 is an end elevation partly broken away as indicated by the line 2—2 on Fig. 1; Fig. 3 is a sectional detail taken along the line 3—3 on Fig. 2; Fig. 4 is a transverse cross-sectional view taken along the line 4—4 on Fig. 1; Fig. 5 is a fragmentary plan showing particularly the arrangement of the control elements for selectively operating the gear elements for obtaining different speeds.

The invention, as illustrated briefly stated comprises two shafts in abutting relation connectible by an internal-external gear train for one speed, by a dental clutch for direct drive and by an external spur gear train including the usual counter-shaft and sliding gears for two other speeds. The latter gear train also includes a reverse idler.

Referring in detail to the drawings and indicating the various parts by suitable characters, 1 is the drive shaft and 2 the driven shaft, these shafts being supported in a two part casing 3 comprising a forward section 4 and rearward section 5 secured together in the usual manner by flanges 6. The shaft 1 is supported at one end in a rolling bearing 7 in the casing section 4; the shaft 2 in a rolling bearing 8 in the casing section 5 and one shaft supports the other at their abutting ends by reason of a pilot bushing bearing 9 interposed between a reduced portion 2a of the shaft 2 and a recess 1a in the rearward end of the shaft 1. A further support for the adjacent ends of the shafts is had by reason of another bearing hereinafter mentioned in connection with the internal-external gear train.

The internal-external gear train comprises two coaxial sets of gear teeth P and P3, the former being rigid with the shaft 1, the latter being supported by hollow gear member 10 surrounding the rear end of the shaft 1 and rotatable relative thereto. The gear member is supported by a bushing bearing 15 interposed between the casing section 4 and the external peripheral surface of the member 10, this member in turn supporting the adjacent ends of the shafts by reason of a bushing bearing 11 interposed between the gear member 10 and the shaft 1. For connecting the two gears P and P3 there is a hollow geared interponent 20 surrounding the shaft 1 and having internal teeth P1 at one end, shown as permanently meshing with the teeth P, and external teeth P2 at the other end shown as permanently meshing with the internal teeth P3. For supporting the geared interponent on a fixed axis of rotation eccentric to the gears P and P3 there is provided a bushing bearing 23 between the external peripheral surface 24 of the member 20 and a reduced forwardly extending tubular portion 4a of the casing section 4.

There is a common means for connecting the shafts directly together and through the gear train just described, comprising, as shown, a clutch member 30 splined to the forward end of the shaft 2 at 31 and having internal clutch teeth 33 engageable selectively with external teeth 34 on the rear end of the shaft 1 to couple the shafts for direct drive, and with the rear ends of external gear teeth 35 rigid with the gear member 10 for connecting the shafts through the gear train. A different modification of the internal-external gear train and controlling means has been more fully set forth and claimed in my copending application Serial No. 69,762 filed Nov. 18, 1925. When the direct connection through the clutch teeth 33 and 34 is established the gearing operates in high speed, and when the internal and external geared connection is established by clutching the shaft 2 to the gear member 10 at 33—35, the gearing operates at a reduced speed by reason of the difference in the diameters of the sets of teeth P–P1–P2–P3. Because the cooperating gear elements of this train comprise external teeth meshing with internal teeth the gearing operates very quietly in this speed.

The external spur gear train comprises a countershaft 40 rigidly mounted in the casing in a bearing 41 in the casing section 4 and a bearing 42 in the casing section 5. The counter-shaft has rigid therewith near its forward end a spur gear 45 shown as permanently in mesh with the forward ends of the teeth 35 on the gear member 10; the counter-shaft is therefore constantly driven as long as the drive shaft 1 is rotated, and at a reduced speed from the gear member 10 by reason of the difference in sizes of the gears 35 and 45. The counter-shaft is arranged to drive the shaft 2 at two forward speeds by reason of the provision of mutually rigid gears 47 and 48 carried by a slidable member 49 splined onto the counter-shaft at 50, the gear 47 being arranged to mesh with a larger spur gear 52 rigid with the shaft 2 and the gear 48 with a larger gear 54. The gears 52 and 54 are integral as shown.

Associated with the counter-shaft and spur gear train is a reverse idler shown in full lines in Fig. 4 and in broken lines in Fig. 1. The idler comprises mutually rigid gears 60 and 61, these gears being slidable on a counter-shaft 62 and arranged to mesh with the gears 47 and 54 respectively when the gear member 49 is in the position shown in Fig. 1.

It will be seen from inspection of Fig. 1 that when the gear member 49 is in its rearward position causing the teeth 47 and 52 to engage, the shaft 2 will be driven at a still slower speed from that imparted to the member 10 of the internal-external gear train. When the gear member 49 is in its forward position causing the teeth 48 and 54 to engage, the shaft 2 will be driven at its slowest forward speed, since the reduction between the gears 48 and 54 is greater than between the gears 47 and 52. The reverse speed operates at approximately the same reduction as the abovementioned slowest speed because the size of the gear 61 as shown is approximately the same as the gear 48, and the gear 60 approximately the same as the gear 47.

A very similar gearing such as above described together with a common means for controlling it is shown and claimed in my copending application Serial No. 153,544 filed Dec. 9, 1926. The gears therein shown are arranged for three forward speeds and reverse whereas the present gear operates for four forward speeds and reverse as above set forth.

The control for the gearing is illustrated in Figs. 1, 2, 4 and 5 and comprises a plurality of slidable bars 70, 71 and 72 mounted in the upper portion of the casing section 4 as shown and each bar having at its rear end a shifting fork engaging the various slidable elements as follows: The bar 70 has a shifting fork 74 engaging a groove 75 in the clutch member 30. The bar 71 has a shifting fork 76 having an additional support by reason of the bar 77 (Fig. 4) rigidly mounted in the casing, the fork engaging a peripheral groove 78 in the forward end of the gear member 49. The bar 72 is similarly connected to a shifting fork 80 having additional support by reason of a bar 81, similar to the bar 77. The fork 80 engages a peripheral groove 82 in the reversing idler gear member. The forward ends of the bars 70, 71 and 72 are shown as projecting beyond the casing and are selectively engageable by a shifting lever 90 pivotally supported at 91 in a bracket 92 surmounting the casing, the lower end 94 of the lever being adapted to enter slots 70a, 71a and 72a in the respective bars. Suitable means such as spring plungers, one being illustrated at 95 in Fig. 1 adapted to enter notches 96 in the upper surface of its respective bar, serve to hold the bars in their shifted positions.

In order that each bar will be positively locked against accidental movement whenever the shift lever 94 is out of engagement therewith, a locking plate 100 is shown as pivoted at 101 to the bracket member and as supported intermediately of its two ends by reason of a pin 102 having a flange 103 engaging below the plate, the pin being normally pressed upwardly by a spring 104. The lower end of the pin extends through a slot 105 in the plate the slot being sufficiently long to allow the plate to swing to and fro over the forward ends of the shifting bars. The forward end of the plate is bifurcated and has downwardly bent or looped portions 107 and 108 at each side thereof, arranged to enter between projections 70b, 71b and 72b on the respective shift bars 70, 71 and 72.

In operation when the shift lever 90 is moved laterally to cause the lower end 94 thereof to engage the slot 71a, the plate 100 will be swung by engagement with the lever 90 into such position that the looped portion 108 will clear the projections 71b and at this time the looped portion 107 will enter between the projections 70b and 72b bridging across from adjacent projections 70b and 72b so that it will be impossible for the bars 70 or 72 to be moved at this time.

The action of the locking plate is substantially the same with reference to the other bars except that when the plate is in its central position (see Fig. 5), the loop 108 prevents accidental shifting of the bar 71 and the loop 107 prevents accidental shifting of the bar 72.

An additional refinement of the shifting arrangement as shown in Fig. 2, consists in the provision of means whereby the shift lever 90 is prevented from engaging the bar 72 until depressed bodily. This consists as shown of a projection 110 on the lower end of the shift lever bearing against a plate 111 rigid with the bracket 92. When the shift lever is thus depressed however, the projection 110 may swing below the lower edge of the plate 111 so as to engage the recess 72a in the bar 72. This prevents accidental shifting into reverse.

One of the early problems encountered in utilizing a gear train such as first described, namely that employing the internal-external gears, was concerned with proper lubrication for the bearings and gear teeth. It was found that neither the gear teeth nor the bearing for the gear elements, such as 10 and 20 could be conveniently lubricated by the usual splash system. This is obviously true because all the elements are in compactly nested arrangement. I have utilized in the present construction, a very simple device for oiling both the bearings and the internal and external gear teeth without depending on the splash system. The arrangement shown is of course utilizable for any type of bearings such as anti-friction rollers or balls, but I have found it to be of extreme importance where bushing bearings such as 11, 15 and 23 are used.

The lubricating device comprises as shown, an oil pump of a well known type indicated generally at 120 in Figs. 1 and 2 and comprising a forward enlarged extension 121 of the bearing bushing 41 having an eccentric circular recess 122 into which the transversely slotted forward end 125 of the counter-shaft projects. Slidable in the slot are a pair of radially movable oil feeder members 126 and 128 normally urged outwardly in opposite directions by a compression spring 127. Suitable circular recesses 121a and 121b lead from the eccentric recess 122 communicating respectively with passages 130 leading to the oil sump through an opening 131 and a passage 133 leading upwardly to the bearings for the internal and external gears. The passage 133 intercepts the circular recess in the casing portion 4a for the bushing bearing 15 as at 134 so as to discharge toward this bushing 15. Leading forwardly from the upper end of the recess 133 is a passage 135 (see Fig. 3) which communicates with a cross passage 136 leading to the exterior of the bushing bearing 23. Any suitable arrangement of grooves and cross grooves on the bushing bearings together with through openings from the external peripheral surface to the internal peripheral surface of these bushing bearings, may be used to allow oil to spread from one end to the other of these bushing bearings and to get to the interior thereof so as to lubricate the friction surfaces of the bearings as well as the gear members 10 and 20. Also the gear members themselves may have respective openings arranged to register with certain of the grooves in order that a portion of the oil forced upwardly by the pump, may be led to the gear teeth P, P1, P2 and P3. An opening 137 is shown for example in the interponent member 20.

For lubricating the bushing bearings 9 and 11 there is shown a passage 140 leading from the enlarged forward portion of the gear member 10 to within it and to the external surface of the bushing 11, which may have external peripheral grooves and cross grooves, one of the latter being shown at 141, and communicating through an opening 142 to one of a suitable number of openings 143 in the bushing 9.

By reason of the constant engagement between the gears 45 and 35 and the constant drive of the internal-external gears, the oil pump is operated continuously as long as the shaft 1 is connected to the engine, hence there will be a continuous supply of oil forced to all the relatively movable adjacent parts of the internal and external gear train.

From the above description it will be seen that I have provided an improved change speed gearing which will operate for a considerable number of speed changes; in which the gear elements for delivering a quiet under speed are adequately and properly lubricated; in which the external spur gears may be well oiled by the usual splash system, and in which all the elements of the gearing which are movable to change from one gear speed to another, have a common control. Further, I have provided an improved interlocking device by reason of which there is no possibility for accidental shifting of one element while another is being operated to change from one speed to another.

I claim:

1. In an automobile change speed gearing, a drive shaft and a driven shaft, a casing supporting said shafts in permanent mutual alignment, an internal-external gear train comprising two sleeve gears internally and externally geared together and to the drive shaft, bearing means associated with the casing to support the sleeve gears on fixed axes of rotation, one sleeve eccentric to the other, selective means for connecting the shafts in one to one ratio, for direct drive, and through the intermediacy of the internal-external gear train for affording a difference of speed between the shafts, a counter shaft and a spur gear thereon, spur gear teeth drivingly rigid with one of the sleeve gears and in constant mesh with said spur gear, a second spur gear drivingly rigid with the counter shaft, and a spur gear drivingly rigid with the driven shaft, said last two mentioned gears being relatively slidable into and out of mesh to establish and interrupt the driving connection between said driving and driven shafts through the spur gears in addition to one of the sleeve gears.

2. In an automobile change speed gearing, a drive shaft, an internal-external gear train comprising two gears internally and externally geared together and to the drive shaft, a driven shaft in alignment with the drive shaft and connecting means to connect the driven to the drive shaft directly for direct drive and to one of the gears for a different speed, a counter shaft and a spur gear thereon, spur gear teeth drivingly rigid with one of the gears and in constant mesh with said spur gear, a second spur gear drivingly rigid with the counter shaft, and a spur gear drivingly rigid with the driven shaft, said last two mentioned gears being relatively slidable into and out of mesh to establish and interrupt the driving connection between said drive and driven shafts through the spur gears in addition to one of the gears.

3. In a transmission, a clutch shaft, a transmission shaft in alignment therewith single clutch means to directly clutch said shafts, a countershaft, means including internal gearing and a gear ring eccentrically surrounding the aligned clutch shaft and transmission shaft by which said countershaft is driven from said driving shaft and a variable speed transmission between the countershaft and driven shaft.

In testimony whereof, I hereunto affix my signature.

CHARLES E. F. AHLM.